United States Patent [19]
Campbell et al.

[11] Patent Number: 5,946,653
[45] Date of Patent: Aug. 31, 1999

[54] SPEAKER INDEPENDENT SPEECH RECOGNITION SYSTEM AND METHOD

[75] Inventors: William Michael Campbell, Phoenix; John Eric Kleider, Scottsdale; Charles Conway Broun; Carl Steven Gifford, both of Gilbert, all of Ariz.; Khaled Assaleh, Mission Viejo, Calif.

[73] Assignee: Motorola, Inc., Schaumburg, Ill.

[21] Appl. No.: 08/942,211

[22] Filed: Oct. 1, 1997

[51] Int. Cl.⁶ .................................................. G10L 9/00
[52] U.S. Cl. ........................ 704/243; 704/254; 704/256; 704/234
[58] Field of Search ................................ 704/254, 256, 704/243, 252, 222, 245, 234

[56] References Cited

U.S. PATENT DOCUMENTS

| | | | |
|---|---|---|---|
| Re. 31,188 | 3/1983 | Pirz et al. | 704/252 |
| 4,336,421 | 6/1982 | Welch et al. | 704/243 |
| 4,908,865 | 3/1990 | Doddington et al. | 381/43 |
| 4,975,959 | 12/1990 | Benbassat | 381/41 |
| 5,179,703 | 1/1993 | Evans | 395/703 |
| 5,182,773 | 1/1993 | Bahl et al. | 704/222 |
| 5,222,146 | 6/1993 | Bahl et al. | 704/243 |
| 5,276,766 | 1/1994 | Bahl et al. | 704/256 |
| 5,333,236 | 7/1994 | Bahl et al. | 704/256 |
| 5,390,136 | 2/1995 | Wang | 64/754 |
| 5,457,770 | 10/1995 | Miyazawa | 395/2.64 |
| 5,479,523 | 12/1995 | Gaborski et al. | 382/159 |
| 5,497,447 | 3/1996 | Bahl et al. | 704/245 |
| 5,509,104 | 4/1996 | Lee et al. | 704/256 |
| 5,522,011 | 5/1996 | Epstein et al. | 704/222 |
| 5,528,728 | 6/1996 | Matsuura et al. | 395/2.41 |
| 5,604,839 | 2/1997 | Acero et al. | 704/234 |
| 5,715,367 | 2/1998 | Gillick et al. | 704/254 |

*Primary Examiner*—David R. Hudspeth
*Assistant Examiner*—Vijay B. Chawan
*Attorney, Agent, or Firm*—Gregory J. Gorrie

[57] ABSTRACT

An improved method of training a SISRS uses less processing and memory resources by operating on vectors instead of matrices which represent spoken commands. Memory requirements are linearly proportional to the number of spoken commands for storing each command model. A spoken command is identified from the set of spoken commands by a command recognition procedure (200). The command recognition procedure (200) includes sampling the speaker's speech, deriving cepstral coefficients and delta-cepstral coefficients, and performing a polynomial expansion on cepstral coefficients. The identified spoken command is selected using the dot product of the command model data and the average command structure representing the unidentified spoken command.

16 Claims, 2 Drawing Sheets

SPEAKER INDEPENDENT SPEECH RECOGNITION SYSTEM AND METHOD

FIELD OF THE INVENTION

This invention relates in general to the field of speech recognition, and, more particularly, relates to speaker independent speech recognition.

BACKGROUND OF THE INVENTION

Modern methods in digital signal and speech processing have made it possible to control a target system by recognizing a spoken command and then applying a stimulus to the target system based on the recognized spoken command. Typically, when a spoken command is identified by a speech recognition system, the spoken command is one of a group of commands represented in a command database. Additionally, speech systems are well suited to control software applications having a menu type user interface. Target systems and software applications controlled using voice commands are desirable because a user can control the target systems or applications by speaking commands thereby improving the ease of operation and user friendliness perceived by the user.

A problem with existing speech recognition systems is that the systems require large amounts of processing and data storage to produce modest recognition success. Additionally, existing systems support small command databases and have difficulty adding new commands and retraining existing commands. Another problem with existing voice command systems is the expensive processing required to remove noise and channel effects from input spoken commands.

Thus, what is needed is, an improved independent speaker recognition system and method for training, retraining, and recognizing spoken commands. What is also needed is a system and method requiring less processing and storage requirements when supporting large command databases. What is further needed is a system and method of removing noise and channel effects in an inexpensive and efficient manner. Also needed are a system and method for more efficiently adding new commands and retraining and reinforcing existing commands.

SUMMARY OF THE INVENTION

The present invention provides in a first embodiment a method of generating command models for a set of commands. Each command model generated is represented by a single vectors. The method comprises the steps of combining the set of feature vectors for each command to create a high order command structure vector for each command, and summing each high order command structure vector to create a total command structure vector. Then, the total command structure vector is added to a scaled version of each high order command structure vector to create a scaled individual command structure vector for each command. Finally, an individual command model is computed for each command using the scaled individual command structure vector for each command and the set of feature vectors for each command.

The present invention also provides in another embodiment a method of identifying an unidentified spoken command from a set of individual command models. The unidentified spoken command is represented by a plurality of spoken feature vectors. Generally, the method comprises the steps of averaging the plurality of spoken feature vectors to produce an average command structure for the unidentified spoken command, and performing a dot product with the average command structure and each individual command model to create a set of score values, each score value is associated with one command of a set of commands. Finally, a command is selected from said set of commands based on a score value from the set of score values.

The present invention further provides in another embodiment a speech recognition system for identifying an unidentified spoken command from a set of individual command models. The unidentified spoken command is represented by a plurality of spoken feature vectors. The speech recognition system preferably comprises a command model memory for storing individual command models for a set of commands, a pattern classifier for averaging the plurality of spoken feature vectors to produce an average command structure for the unidentified spoken command, performing a dot product with said average command structure and each individual command model to create a set of score values, each score value being associated with a command of the set of commands. Finally, a command selector for selecting one command from the set of commands based on a score value.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, an improved independent speaker recognition system and method for training, retraining, and recognizing spoken commands. The present invention also provides a system and method using less processing and storage requirements for processing and recognizing spoken commands. The present invention also provides a system and method of removing noise and channel effects in an inexpensive and efficient manner.

Figure 1:
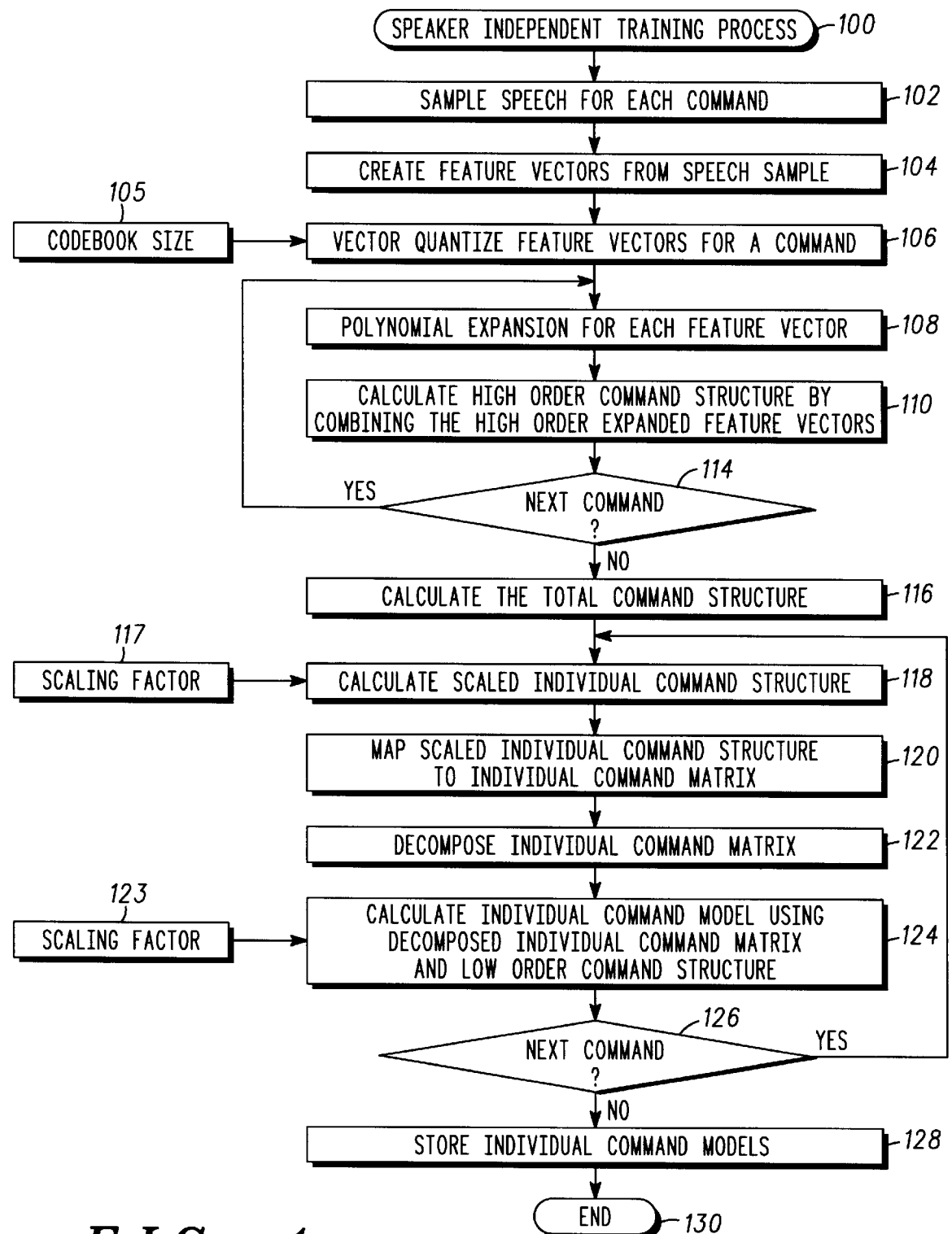
FIG. 1 is a flowchart illustrating a speaker independent training process in accordance with a preferred embodiment of the present invention.

FIG. 1 is a flowchart illustrating a speaker independent training process in accordance with a preferred embodiment of the present invention. Procedure 100 (FIG. 1) describes an improved procedure for training the speaker independent speech recognition system. A sequence of spoken commands or representations thereof are presented to procedure 100 for training the speaker independent speech recognition system. In the preferred embodiment, training is accomplished by creating a command model for each spoken command.

In task 102, a speech sample for a spoken command is obtained from a speaker. In the preferred embodiment of the present invention, the speech sample for the command is received through a microphone and is preferably sampled and converted to a digital representation of the original spoken command. The digital representation of the original spoken command is comprised of a series of overlapping windows of sampled speech having the silence removed. Preferably, each overlapping window is a 30 millisecond Hamming window which is provided every 10 milliseconds. In another embodiment, digitized speech samples are provided as input to task 102 and may require some or no additional processing for conversion to the series of Hamming windows representing the original spoken command.

In task 104, feature vectors are created from the digital representation of the speech sample. In the preferred embodiment, a feature vector is created for each Hamming window. In the preferred embodiment, an LP analysis is performed and includes generating a predetermined number of coefficients for every Hamming window of the removed silence speech sample. Preferably the number of coefficients for the LP analysis is determined by the LP order. LP orders of 10, 12 and 16 are desirable however other LP orders may be used. The preferred embodiment uses an LP order of 12. In this preferred embodiment, task 104 generates 12 coefficients for every Hamming window (e.g., every 10 milliseconds, 30 milliseconds of removed silence speech). The result of task 104 may be viewed as a Z×12 matrix, where Z is the number of rows and 12 (the LP order) is the number of columns. Z is dependent on the length of the removed silence speech sample, and may be on the order of several hundred or thousand. The Z×12 matrix of task 104 may also be viewed as Z sets of LP coefficients. In this example, there are 12 LP coefficients for every Hamming window of the removed silence speech. Each set of LP coefficients represents a feature vector. Additionally, cepstral coefficients and delta-cepstral coefficients are determined from the LP coefficients.

Task 104 includes performing a linear transform on the LP coefficients. Preferably, the linear transformation performed includes a cepstral analysis which separates unwanted from wanted information retaining information important to speech recognition. Performing the cepstral analysis is an optional part of task 104, however, for accurately identifying a speech, cepstral analysis should be performed. Determining cepstral coefficients and delta-cepstral coefficients is a process known in the art. The result of performing the cepstral and delta-cepstral analysis may be viewed as a Z×24 matrix where 12 is the cepstral order. The cepstral order may be the same order as the LP order. The collection of feature vectors for the series of Hamming windows is comprised of either the sets of LP coefficients or cepstral and delta-cepstral coefficients associated therewith. The collection of feature vectors representing a spoken command are titled a feature set.

In task 106, a vector quantization is performed on the cepstral coefficients from task 104. One purpose of task 106 is to cluster the speech information for each spoken command into a common size matrix representation. Because tasks 102 through 112 are performed for each spoken command, task 104 may result in a different number of feature vectors for each spoken command because each command may have a speech sample of a different time length. The vector quantization of task 106 results in a predetermined set of feature vectors for each spoken command.

In the preferred embodiment, task 106 involves performing a vector quantization of a predetermined codebook size. Codebook sizes are two raised to the n ($2^n$) where n is an integer preferably between 1 and 20. Desirably n is either 6, 7 or 8 and preferably n is 7. In the preferred embodiment, when n is seven, a codebook size of $2^n$ results in 128 sets of features for each spoken command. Accordingly, when the cepstral order of task 104 is 12 and delta-cepstral coefficients are calculated, task 106 results in 128 sets of 24 coefficients for each speaker. This may be viewed as a matrix in which there are 128 rows and 24 columns. Each row represents one feature vector. Accordingly, task 106 results in 128 feature vectors for the speaker for which task 106 is being performed. The codebook size may be predetermined or it may be provided as a system input from codebook size input 105. When the codebook size is 128 and the cepstral order is 12 and delta-cepstral coefficients are calculated, the feature matrix is a 128×24 matrix. For each spoken command, there are 128 feature vectors, each feature vector having 24 feature elements. The result of task 106 is herein referred to as a feature matrix for a particular spoken command.

In task 108, a polynomial expansion is performed on each feature vector. In the preferred embodiment, a high order polynomial expansion is performed on each feature vector of the feature matrix. In the preferred embodiment, the high order polynomial expansion is a fourth order polynomial expansion; although, other polynomial orders are suitable. The results of task 108 are viewed as one matrix. When the cepstral order is 12 and delta-cepstral coefficients are calculated, the high order polynomial expansion for each feature vector produces a high order matrix of dimension codebook size number of rows and 20,475 columns.

In task 110, a high order command structure is calculated by summing the feature vectors of the high order matrix. In the preferred embodiment, the high order command structure is calculated for each spoken command. The result of task 110 is a single vector of same dimension as a single vector of the high order matrix. In the embodiment having a high order matrix with the dimensions discussed in task 108, the resultant high order command structure (vector) has 20,475 elements.

In task 114, when feature vectors for other spoken commands require the processing of task 108–110, task 108 is performed. Otherwise, task 116 is performed.

In task 116, a total command structure is calculated. In the preferred embodiment, the resultant high order command structure (vector) representing each spoken command is summed to produce a total command structure. Preferably, the total command structure is a vector having the same number of elements as each high order command structure, or 20,475 elements.

In task 118, a scaled individual command structure is calculated. In the preferred embodiment, the scaled individual command structure, $r_{i,scaled}$, is calculated for the $i^{th}$ spoken command using equation (eqn.) 1, $$r_{i,scaled} = r_{tcs} + ((N_{all}/N_i) - 2) * r_{i,hocs} \qquad \text{(eqn. 1)}$$

Where:

$r_{i,scaled}$ is the scaled individual command structure for the $i^{th}$ spoken command;

$r_{tcs}$ is the total command structure created in task 116 for the combination of all spoken commands being trained;

$N_{all}$ is a summation of the number of feature vectors for each of the feature matrices created in task 106;

$N_i$ is the number of feature vectors for the feature matrix created in task 106 for the ith spoken command; and $r_{i,hocs}$ is the high order command structure created in task 110 for the $i^{th}$ spoken command.

The scalar represented by $N_{all}$ divided by $N_i$ is titled the scaling factor and is represented as scaling factor input 117.

Preferably, the scaled individual command structure calculated in task 118 is a vector having 20,475 elements and is determined for each spoken command being trained.

In task 120, the scaled individual command structure is mapped to an individual command matrix, $R_i$. In the preferred embodiment, the process for mapping a scaled individual command structure, $r_{i,scaled}$, to an individual command matrix, $R_i$, is best described as an example. For example, consider the case of a two element scaled individual command structure, $r_{1,scaled}$ in eqn. 2, $$r_{1,scaled} = \begin{bmatrix} r_1 \\ r_2 \\ r_3 \\ r_4 \\ r_5 \\ r_6 \end{bmatrix}. \quad \text{(eqn. 2)}$$

The second order expansion (i.e., high order polynomial expansion) for eqn. 2 is provided in eqn. 3, $$r_{1,scaled} = p_2(x) = \begin{bmatrix} 1 \\ x_1 \\ x_2 \\ x_1^2 \\ x_1 x_2 \\ x_2^2 \end{bmatrix}. \quad \text{(eqn. 3)}$$

Compute a square individual command matrix having row and column dimensions determined by eqn. 4, $$p(x)p(x)^t = \begin{bmatrix} 1 & x_1 & x_2 \\ x_1 & x_1^2 & x_1 x_2 \\ x_2 & x_1 x_2 & x_2^2 \end{bmatrix} = R_1, \quad \text{(eqn. 4)}$$

where $p(x)^t$ represents the transpose of vector $p(x)$.

Therefore, the mapping of the scaled individual command structure to the individual command matrix is performed by copying the second order elements (high order polynomial expansion) found in eqn. 3 to the corresponding matrix element in eqn. 4. Again, for example, the $x_1 x_2$ element of eqn. 3 would map to the matrix elements having indices $R_1(3,2)$ and $R_1(2,3)$. The mapping approach described in task 120 can be extended to higher order systems where the high order polynomial expansion is two times that of the low order polynomial expansion.

In task 122, the individual command matrix, $R_i$, is decomposed. In the preferred embodiment, the individual command matrix for the $i^{th}$ spoken command is decomposed using Cholesky decomposition. This is represented in equation form in eqn. 5, $$L_i^t L_i = R_i \quad \text{(eqn. 5)}$$

where $L_i^t$ is the transpose of matrix $L_i$ and both matrices are determined using Cholesky decomposition.

In task 124, the individual command model, $w_i$, is calculated for the $i^{th}$ spoken command. In the preferred embodiment, the individual command model, $w_i$ is calculated using back substitution to solve eqn. 6.

$$L_i^t L_i w_i = ((N_{all}/N_i) - 1) * a_i \quad \text{(eqn. 6)}$$

Where $L_i^t$, $L_i$, $w_i$, $N_{all}$, $N_i$ are each described above and $a_i$ is the low order command structure for the ith spoken command. Preferably, the low order command structure is determined as a subvector of the high order command structure.

In task 126, when individual command models for other spoken commands require the processing of task 118–124, task 118 is performed. Otherwise, task 128 is performed.

In task 128, the individual command models representing each spoken command in the training model are stored into a command model database. Among other things, the command model database may be random access memory (RAM), commercial third-party database, magnetic storage media such as disk or tape, read-only memory (ROM), and other types of suitable data storage.

In the preferred embodiment, efficiently adding a new command and retraining and reinforcing an existing command are preferably achieved by storing the high order command structures. Storing the high order command structures for each spoken command reduces the number of computations performed when using procedure 100 for retraining, adding, and reinforcing a command. Furthermore, eqns. 5 and 6 are of low complexity and are computationally inexpensive; therefore, determining a command model for retraining, adding, and reinforcing a command provides a substantial performance benefit when determining an individual command model.

Figure 2:
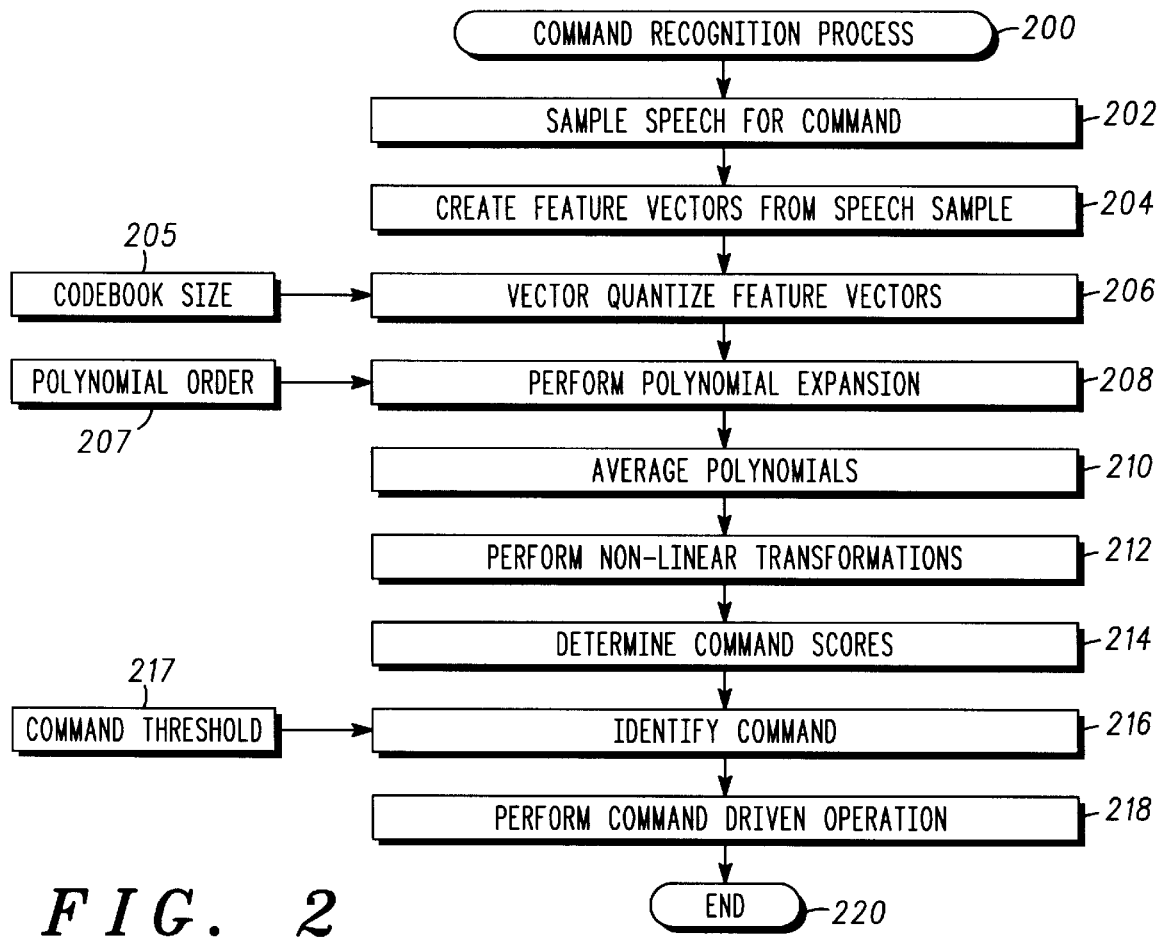
FIG. 2 is a flowchart illustrating a speaker independent command recognition process in accordance with a preferred embodiment of the present invention.

FIG. 2 is a flowchart illustrating a speaker independent command recognition process in accordance with a preferred embodiment of the present invention. Procedure 200 (FIG. 2) describes an improved procedure for recognizing an unidentified spoken command regardless of the identity of the speaker. In the preferred embodiment, recognition of the unidentified spoken command is accomplished by multiplying each command model in the command model database with the average command structure (discussed below) for the unidentified spoken command. The unidentified command is identified based on the results of the multiplying step.

In task 202, a speech sample for an unidentified spoken command is obtained from a speaker. In the preferred embodiment, task 202 performs an operation on the unidentified spoken command which is functionally similar to that of task 102 (FIG. 1). The result of performing task 202 is a series of overlapping windows of digitized speech. Each overlapping window is a 30 millisecond Hamming window which is provided every 10 milliseconds.

In task 204, feature vectors are created from the digital representations of the speech sample. In the preferred embodiment, a feature is created for each Hamming window. Similar to task 104, performing task 204 preferably results in a collection of feature vectors representing an unidentified spoken command.

In task 206, vector quantization is performed on the cepstral coefficients from task 204. Task 206 is similar to task 106 and results in a predetermined size set of feature vectors for the unidentified spoken command. Also, similar to that of codebook size input 105, the codebook size for task 206 may be predetermined or provided by codebook size input 205. The set of feature vectors determined in this task is herein referred to as a feature matrix for a particular unidentified spoken command.

In task 208, a polynomial expansion is performed on each feature vector. In the preferred embodiment, a low order polynomial expansion is performed on each feature vector of the feature matrix representing the unidentified spoken command. Similar to that of task 108, the order of the low order polynomial expansion is 2 and may be determined by polynomial order input 207; although, other polynomial orders are suitable. Additionally, in the preferred embodiment, the low order polynomial expansion for each feature vector produces a low order matrix of dimension codebook size number of rows and 325 columns.

In task 210, the feature vectors created in task 208 are averaged to produce an average command structure for the unidentified spoken command. In the preferred embodiment, the number of elements for the average command structure (vector) is 455.

In task 212, a non-linear transform is performed on each combination of the dot product of the individual command models and the average command structure (vector). Performing a non-linear transform on each combination helps remove noise and channel effects from each of the individual command models. The result of task 212 is a set of combinations, each having effectively removed noise and channel effects from feature vectors representing the spoken commands. The dimensions of each combination is a scalar value, similar to that of task 214. When noise and channel effects are not of concern for the individual command models, task 212 is optional.

Task 212 provides a new method for reducing noise and channel effects which greatly reduces computation and requires only one pass through the feature vector input data. Consider, for example, reducing the noise and channel effects for a second order individual command model using an affine transform of each input feature vector, x, as shown in eqn. 7, $$x \rightarrow Ex + d; \qquad \text{(eqn. 7)}$$

where,

E is a matrix, and d is a vector.

A second order individual command model, w, applied to a feature vector, x, can be represented in eqn. 8, $$q(x) = a + b^t x + x^t C x; \qquad \text{(eqn. 8)}$$

where, a is a scalar, b is a vector, and C is a matrix

This representation is equivalent to the form shown in eqn. 9, $$w^t p(x); \qquad \text{(eqn. 9)}$$

where the coefficients of w are in one-to-one correspondence with the entries of a, b, and C, and using eqn. 8 and eqn. 9 provides eqn. 10, $$q(x) = w^t p(x). \qquad \text{(eqn. 10)}$$

To illustrate the representation of $w^t p(x)$ as q(x), use a two variable first order problem. Consider eqns. 11, 12, 13, and 14, $$x = \begin{bmatrix} x_1 \\ x_2 \end{bmatrix}, \qquad \text{(eqn. 11)}$$

$$p(x) = \begin{bmatrix} 1 \\ x_1 \\ x_2 \\ x_1^2 \\ x_1 x_2 \\ x_2^2 \end{bmatrix}, \qquad \text{(eqn. 12)}$$

$$w = \begin{bmatrix} w_1 \\ w_2 \\ w_3 \\ w_4 \\ w_5 \\ w_6 \end{bmatrix}, \text{ and} \qquad \text{(eqn. 13)}$$

$$w^t p(x) = w_1 + w_2 x_1 + w_3 x_2 + w_4 x_1^2 + w_5 x_1 x_2 + w_6 x_2^2. \qquad \text{(eqn. 14)}$$

So, represent q(x) in eqns. 15, 16, and 17, $$a = w_1, \qquad \text{(eqn. 15)}$$

$$b = \begin{bmatrix} w_2 \\ w_3 \end{bmatrix}, \text{ and} \qquad \text{(eqn. 16)}$$

$$C = \begin{bmatrix} w_4 & 0.5 w_5 \\ 0.5 w_5 & w_6 \end{bmatrix}. \qquad \text{(eqn. 17)}$$

Substituting the affine transformation into q(x) gives eqn. 18, $$q(Ex+d) = (a + b^t d + d^t C d) + (b + d(C + C^t))^t E x + x^t E^t C E x. \qquad \text{(eqn. 18)}$$

Suppose the new model is provided in eqn. 19, $$q_{new}(x) = a_{new} + b^t_{new} x + x^t C_{new} x = q(Ex + d), \qquad \text{(eqn. 19)}$$

where a, b, and C are provided by eqns. 20, 21, and 22, respectively, $$a_{new} = (a + b^t d + d^t C d), \qquad \text{(eqn 20)}$$

$$b_{new} = (b + d(C + C^t))^t E, \qquad \text{(eqn 21)}$$

$$C_{new} = E^t C E. \qquad \text{(eqn 22)}$$

The new model can be represented as $w^t_{new} p(x) = q_{new}(x)$. The process of obtaining the new coefficients $w_{new}$ from w is in general a nonlinear transformation.

The method described above requires one pass through the data. In existing systems, the affine transformation would be determined on the first pass and then each feature vector would be passed through the affine transformation on the second pass. The method described above determines the affine transformation on the first pass and then performs a non-linear remapping of the individual command models.

In task 214, a score for each command model is determined. In the preferred embodiment, a dot product operation is performed between the individual command model (vector) representing each spoken command and the average command structure (vector) provided in task 210. Preferably, the result is a set of scalar values, one scalar value per dot product operation.

Since both task 212 and task 214 produce the "score" values for each spoken command in the command database, when task 212 is performed, task 214 is not performed, and visa versa. In the preferred embodiment, task 212 is performed when noise and channel effects are to be removed from the spoken commands. Task 214 is performed when noise and channel effects are of lesser concern and don't appreciably effect the identification of spoken commands.

In task 216, a command is identified based on the results of task 214. In the preferred embodiment, the command model associated with the largest score value in task 214 determines the unidentified command. Command threshold input 217 provides an optional input to set or change the maximum and minimum thresholds for recognizing unidentified commands. In the preferred embodiment, the result of task 216 is to store the identified command or group of commands in memory for further processing.

In task 218, a command driven operation is performed. In the preferred embodiment, the identified command stored in memory is used for further processing. Among other things, the identified command is used to provide command input to a computer software application, control a hardware apparatus, or provide voice controlled input to some other apparatus.

Figure 3:
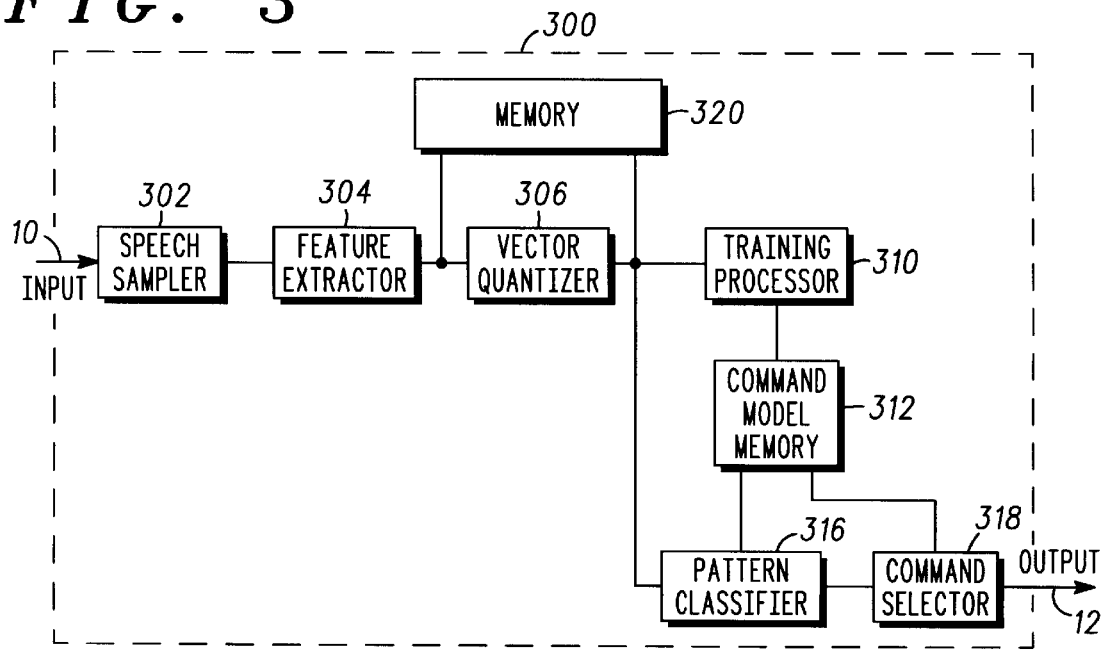
FIG. 3 illustrates a speaker independent speech recognition system in accordance with a preferred embodiment of the present invention.

FIG. 3 illustrates a speaker independent speech recognition system in accordance with a preferred embodiment of the present invention. Speaker independent speech recognition system (SISRS) 300 (FIG. 3) illustrates an improved apparatus for training and retraining individual command models for use in recognizing unidentified commands. SISRS 300 is suitable for performing the procedures of FIG. 1 and FIG. 2. Preferably, SISRS 300 is comprised of speech sampler 302, feature extractor 304, vector quantizer 306, training processor 310, command model memory 312, pattern classifier 316, command selector 318, and memory 320.

Speech sampler 302 accepts speech input 10 into SISRS 300. Speech input 10 may be spoken commands in analog format or in pre-processed digital format. An example of analog format input is when speech input 10 is a microphone coupled to speech sampler 302. Spoken commands received in analog format are converted to digital format by an A/D converter within speech sampler 302. An example of pre-processed digital format input is when speech input 10 provides digitally converted speech samples to speech sampler 302. Preferably, speech sampler 302 is capable of determining the speech format. In the preferred embodiment, speech sampler 302 produces a digital representation of the original spoken command comprised of a series of overlapping windows of sampled speech having the silence removed. Preferably, each overlapping window is a 30 millisecond Hamming window which is provided every 10 milliseconds.

Feature extractor 304 is preferably coupled to speech sampler 302, vector quantizer 306, and memory 320. In the preferred embodiment, feature extractor 304 accepts a series of overlapping windows of sampled speech for a spoken command and produces a set of feature vectors representing the spoken command. Feature extractor 304 produces one feature vector for each Hamming window output from speech sampler 302. In one embodiment of the present invention, feature extractor 304 stores the feature vectors which represent the spoken command in memory 320. In the preferred embodiment, feature extractor 304 outputs feature vectors to memory 320 and vector quantizer 306.

Vector quantizer 306 (VQ) is preferably coupled to feature extractor 304, memory 320, training processor 310, and pattern classifier 316. In the preferred embodiment, VQ 306 accepts feature vectors input from feature extractor 304. VQ 306 vector quantizes the feature vectors producing a predetermined number of feature vectors representing the spoken command. Preferably, VQ 306 stores vector quantized feature vectors in memory 320. The number of vector quantized feature vectors is determined from a changeable codebook size parameter. In the preferred embodiment, the codebook size is 128. In other embodiments, codebook sizes on the order of hundreds or thousands are acceptable. In another embodiment, VQ 306 is optional.

Training processor (TP) 310 is preferably coupled to VQ 306, memory 320, and command model memory 312. In the preferred embodiment, TP 310 accepts feature vectors from VQ 306. TP 310 processes feature vector inputs to produce command models which represent spoken commands. Preferably, TP 310 processes feature vectors using a speaker independent training process such as procedure 100 (FIG. 1). The command models created by TP 310 are stored in command model memory 312 for use in recognizing unidentified commands.

Pattern classifier (PC) 316 is preferably coupled to VQ 306, memory 320, and command model memory 312. In the preferred embodiment, PC 316 accepts feature vector inputs. PC 316 combines feature vector inputs representing an unidentified command and command models stored in command model memory 312 to determine score values associated therewith. Preferably PC 316 outputs a score value or a set of score values to command selector (CS) 318. PC 316 also provides improvement by optionally performing non-linear transformations on individual command models. PC 316 performs operations on individual command models instead of performing non-linear transformations on feature vectors. Typically, reducing noise and channel effects on feature vectors requires significantly more processing power than performing similar operations on individual command models.

CS 318 is coupled to PC 316 and command model memory 312. Using the score values determined by PC 316, CS 318 determines a best match or group of best matches which identifies the previously unidentified command. CS 318 associates matches with the previously unidentified command using the individual command models in command model memory 312. In the preferred embodiment, CS 318 dispatches computer messages to software applications and signals to hardware apparatus to control operations of each.

Thus what has been shown are a system and method for improved training, retraining, and recognizing spoken commands. What has also been shown are a system and method requiring limited processing and storage requirements for processing and recognizing spoken commands. Also shown are a system and method for removing noise and channel effects from a command model database in an inexpensive and efficient manner.

Thus, a speaker independent speech recognition system and method have been described which overcomes specific problems and accomplishes certain advantages relative to prior art methods and mechanisms. The improvements over known technology are significant. The expense, complexities, and high processing and data storage costs are avoided.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of generating command models from a set of spoken commands, each spoken command being represented by a set of feature vectors determined from speech signals, the method comprising the steps of:

vectorily summing each feature vectors associated with each spoken command to create a single command vector for each spoken command;

summing each single command vector associated with each spoken command to create a command set vector;

scaling each single command vector inversely proportional to a number of said feature vectors of said set representing each spoken command; and adding the command set vector to each single command vector to create a scaled single command vector for each spoken command to create an individual command model for each command, the individual command model being a single vector.

2. A method as claimed in claim 1 further comprising the step of performing at least a third order polynomial expansion on the set of feature vectors to create a set of expanded feature vectors for each spoken command, and wherein the vectorily summing step includes the step of combining each expanded feature vector for each spoken command to create the single command vector for each spoken command.

3. A method as claimed in claim 2 mapping elements of the scaled single command vector for each spoken command to a command matrix, wherein the command matrix is determined by multiplying the scaled single command vector and a transpose of the scaled single command vector;

decomposing the command matrix for each spoken command to determine a decomposed matrix and a transpose of the decomposed matrix; and solving for a command model for each spoken command based on the decomposed matrix, the feature vectors, and at least some of the elements of the scaled single command vector associated therewith, each command model representing one of the set of spoken commands.

4. A method as claimed in claim 1 further comprising the step of selecting commands spoken by a plurality of different individuals.

5. A method as claimed in claim 1 further comprising the steps of:

sampling speech to create a speech sample representing each of said set of spoken commands;

removing silence from each speech sample;

creating a plurality of overlapping time-windows for said speech sample;

extracting a feature vector for each overlapping time window; and vector quantizing each feature vector for each overlapping time window to produce said set of feature vectors for each spoken command.

6. A method of generating command models for a set of commands, each command being represented by a set of feature vectors, the method comprising the steps of:

combining the set of feature vectors for each command to create a high order command structure vector for each command;

summing each high order command structure vector to create a total command structure vector;

adding the total command structure vector to a scaled version of each high order command structure vector to create a scaled individual command structure vector for each command;

computing an individual command model for each command using the scaled individual command structure vector for each command and the set of feature vectors for each command; and identifying an unidentified spoken command, said unidentified spoken command being represented by a plurality of spoken feature vectors, the identifying step further comprising the steps of:

averaging the plurality of spoken feature vectors to produce an average command structure for the unidentified spoken command;

performing a dot product with said average command structure and each individual command model to create a set of score values, each score value being associated with one command of the set of commands; and selecting a command from said set of commands based on a score value.

7. A method as claimed in claim 6 further comprising the step of providing an instruction to perform an operation based on the command.

8. A method as claimed in claim 6 wherein the step of identifying said unidentified spoken command further includes the step of performing a non-linear transform on each individual command model to produce non-linear transformed individual command models, and wherein the performing a dot product step includes the step of performing a dot product with said average command structure and each non-linear transformed individual command model to create said set of score values, each score value being associated with one command from said set of commands.

9. A method as claimed in claim 8 further comprising the step of determining said plurality of spoken feature vectors, the step of determining said plurality of spoken feature vectors comprising the steps of:

sampling said unidentified spoken command to create a speech sample representing said unidentified spoken command;

removing silence from the speech sample of the unidentified spoken command;

creating a plurality of overlapping time-windows for said speech sample of the unidentified spoken command;

extracting a feature vector for each overlapping time window of the unidentified spoken command; and vector quantizing each feature vector for each overlapping time window to produce said set of feature vectors for the unidentified spoken command.

10. A method of identifying an unidentified spoken command from a set of individual command models, said unidentified spoken command being represented by a plurality of spoken feature vectors, the method comprising the steps of:

averaging the plurality of spoken feature vectors to produce an average command structure for the unidentified spoken command;

performing a dot product with said average command structure and each individual command model to create a set of score values, each score value being associated with one command of a set of commands; and selecting a command from said set of commands based on a score value from said set of score values.

11. A method as claimed in claim 10 wherein the method of identifying an unidentified spoken command further includes the step of performing a non-linear transform on each individual command model to produce non-linear transformed individual command models, and wherein the performing a dot product step includes the step of performing a dot product with said average command structure and each non-linear transformed individual command model to create said set of score values, each score value of said set of score values being associated with one command from said set of commands.

12. A method as claimed in claim 11 further comprising the step of generating each individual command model for each command of said set of commands, each command of said set of commands being represented by a set of feature vectors, the method comprising the steps of:

combining the set of feature vectors for each command to create a high order command structure vector for each command;

summing each high order command structure vector to create a total command structure vector;

adding the total command structure vector to a scaled version of each high order command structure vector to create a scaled individual command structure vector for each command; and computing each individual command model for each command using the scaled individual command structure vector for each command and the set of feature vectors for each command.

13. A method as claimed in claim 12 wherein the generating step further comprises the step of mapping each scaled individual command structure vector to a matrix, and wherein the computing step includes the step of computing each individual command model for each command using a decomposed version of the matrix, a scaling factor and the set of feature vectors for the command.

14. A speech recognition system for identifying an unidentified spoken command from a set of individual command models, said unidentified spoken command being represented by a plurality of spoken feature vectors, the speech recognition system comprising:

a command model memory for storing individual command models for a set of commands;

a pattern classifier for averaging the plurality of spoken feature vectors to produce an average command structure for the unidentified spoken command, performing a dot product with said average command structure and each individual command model to create a set of score values, each score value being associated with a command of the set of commands; and a command selector for selecting one command from said set of commands based on a score value.

15. A speech recognition system as claimed in claim 14 wherein the pattern classifier includes means for performing a non-linear transform on each individual command model to produce non-linear transformed individual command models, and means for performing said dot product with said average command structure and each non-linear transformed individual command model to create said set of score values, each score value being associated with one command of the set of commands.

16. A speech recognition system as claimed in claim 15 further comprising a training processor for generating said individual command models for said set of commands, each command of said set of commands being represented by a set of feature vectors, the training processor including:

means for combining the set of feature vectors for each command to create a high order command structure vector for each command;

means for summing each high order command structure vector to create a total command structure vector;

means for adding the total command structure vector to a scaled version of each high order command structure vector to create a scaled individual command structure vector for each command; and means for computing an individual command model for each command using the scaled individual command structure vector for each command and the set of feature vectors for the command.

* * * * *